United States Patent [19]

Jeon

[11] Patent Number: 5,799,020
[45] Date of Patent: Aug. 25, 1998

[54] DISTRIBUTED CYCLE RESET PROTOCOL FOR SHARING SINGLE MEDIUM

[75] Inventor: Hong Bum Jeon, Seoul, Rep. of Korea

[73] Assignee: Korea Telecommunication Authority, Seoul, Rep. of Korea

[21] Appl. No.: 579,210

[22] Filed: Dec. 28, 1995

[30] Foreign Application Priority Data

Dec. 31, 1994 [KR] Rep. of Korea ............... 94-40525

[51] Int. Cl.⁶ ..................................................... H04L 12/28
[52] U.S. Cl. ........................... 370/468; 370/444; 370/462
[58] Field of Search ................................ 370/440, 443, 370/444, 447, 450, 451, 453, 455, 457, 458, 422, 462, 468

[56] References Cited

U.S. PATENT DOCUMENTS

| | | | |
|---|---|---|---|
| 5,245,605 | 9/1993 | Ofek | 370/85.12 |
| 5,271,008 | 12/1993 | Limb | 370/85.1 |
| 5,339,314 | 8/1994 | Tanaka et al. | 370/13 |
| 5,392,286 | 2/1995 | Tanaka et al. | 370/94.1 |
| 5,566,179 | 10/1996 | Kobayashi et al. | 370/85.15 |

*Primary Examiner*—Hassan Kizou
*Assistant Examiner*—A. Bnimoussa
*Attorney, Agent, or Firm*—Merchant, Gould, Smith, Edell, Welter & Schmidt

[57] ABSTRACT

A distributed cycle reset protocol used in a system including a plurality of nodes sharing a single medium, which reduces the reset overhead generated due to an increased medium distance and increased transmission rate in accordance with a reset made by the co-operation between two adjacent nodes. The distributed cycle reset protocol includes a distributed medium connection control unit for controlling each of the nodes in such a manner that a node, in which all quotas thereof have been exhausted, is allocated with new quotas to enter a new cell transmission cycle when it receives a reset signal from a lower-order node after transmitting a reset signal to a higher-order node.

5 Claims, 4 Drawing Sheets

(a)

(b)

(QUOTA exhausted: a, d, h, m, q, s, n
RESET received: c, f, i, j, l, n, p
Higher priority reset occurred : b, e, g, i, k, l, o, q, r)

DISTRIBUTED CYCLE RESET PROTOCOL FOR SHARING SINGLE MEDIUM

BACKGROUND OF THE INVENTION

1. Field of the Invention

The present invention relates in general to a distributed cycle reset protocol for integrated services digital networks (ISDNs), and more particularly to a distributed cycle reset protocol which reduces the reset overhead generated due to an increased medium distance and increased transmission rate in accordance with a reset made by the co-operation between two adjacent nodes.

2. Description of the Prior Art

Generally, media connection control methods used in ring type systems are classified into a method wherein tokens are used (Token ring and FDDI) and a method for re-allocating quotas through the cycle reset (ATMR, Metaring, and HMR).

In accordance with the method using tokens, only nodes with such tokens are allowed to transmit information. This method has been analyzed as being suitable for systems which operate within a relatively short distance (several kilometers) at a low rate (less than 100 Mbps).

On the other hand, the method using the cycle reset is mainly used for protocols of slotted ring systems which perform communications by allocating time slots in a local area network (LAN). This method has been analyzed as being suitable for systems which operate over a longer distance at a high rate. In accordance with this method, each node in every cycle is previously allocated with a certain number of cells to be transmitted. In such a manner, the medium sharing between nodes is controlled.

When all nodes completely transmit all cells previously allocated thereto, this is sensed to start a new cycle in accordance with the above-mentioned conventional cycle. In order to reduce overheads generated due to the sensing operation, various protocols such as ATMR[1], Metaring[2] and HMR[3] have been used.

ATMR[1] uses a method wherein the latest data-transmitting node senses stopping of data transmission operations of the remaining nodes and then generates a cycle reset signal. Since all nodes can generate such a cycle reset signal, this method can reduce the number of overheads as compared to a method wherein the cycle period is regulated by the central node. However, this method is problematic in that the reset overhead is increased by a higher transmission speed or a longer system distance because nodes completing their data transmission earlier than the latest data-transmitting node are standby without transmitting data until they receive a reset signal generated from the latest data-transmitting node.

Metaring[2] uses a time-out mechanism wherein each node resets its cycle using a control signal, which is called a SAT message. A node which receives such a SAT completely transmits data allocated thereto and then transfers the SAT to a next node. If a node completely transmits all data allocated thereto within a predetermined time without receiving any SAT, it generates a SAT by itself and sends it to a next node. Thereafter, the node resets its cycle. However, it is difficult to manage timers for individual nodes with this method. It is also difficult to ensure a fair bandwidth sharing and to apply a multiple priority.

On the other hand, HMR[3] uses reset tokens to reset the cycle of each node. When a token has arrived at a node, this node can be re-allocated with a new cell quota after transmitting all cells previously allocated thereto or emptying itself of its transmitting quota and then transmit the token to a next node. In accordance with the HMR scheme, the traffic transfer according to the lower-order priority is suppressed when the token cycling time with a higher-order priority which has arrived in the multiple-priority order is higher than a predetermined value. In this case, accordingly, traffics with the higher-order priority are preferentially serviced. This scheme is a superior protocol for services to traffics of a multiple-priority order. However, this scheme has a drawback in that the reset overhead increases when the transmission speed increases or when the distance between media increases. This is because one token resets each node while cycling in accordance with each priority order.

SUMMARY OF THE INVENTION

Therefore, an object of the present invention is to provide a distributed cycle reset protocol for reducing the reset overhead generated due to an increased medium distance and an increased transmission rate.

In accordance with one aspect, the present invention provides a distributed cycle reset protocol used in a system including a plurality of nodes sharing a single medium, comprising distributed medium connection control means for controlling each of the nodes in such a manner that a node, in which all quotas thereof have been exhausted, is allocated with new quotas to enter a new cell transmission cycle when it receives a reset signal from a lower-order node after transmitting a reset signal to a higher-order node.

In accordance with another aspect, the present invention provides a distributed cycle reset protocol used in a system including a plurality of nodes sharing a single medium, the nodes performing their cell transmission cycles in accordance with at least two priorities, respectively, wherein a node of a specific priority which is not the highest priority resets its cell transmission cycle only after a higher-order node resets its cell transmission cycle even though the former node is in a state that it has received a reset signal associated therewith from a lower-order node under a condition that its quotas have been exhausted.

BRIEF DESCRIPTION OF THE DRAWINGS

The above and other objects, features and advantages of the present invention will be more clearly understood from the following detailed description taken in conjunction with the accompanying drawings in which.

DETAILED DESCRIPTION OF THE PREFERRED EMBODIMENTS

Figure 1:
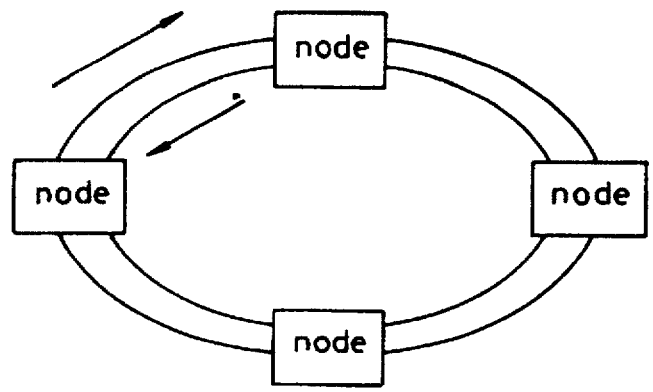
FIG. 1 is a schematic view illustrating a system to which a distributed cycle reset protocol according to the present invention is applied.

FIG. 1 is a schematic view illustrating a system to which a distributed cycle reset protocol according to the present invention is applied. This system has a dual ring structure provided among nodes.

The protocol of the present invention is basically applied to a network having such a dual ring structure as shown in FIG. 1. Of course, this protocol may also be applied to other networks which have a single ring structure or bus structure.

For LANs or distributed subscriber's networks, such ring structures are known as being superior to the bus structure in terms of the total traffic processing rate or fair bandwidth use among nodes and transfer delay. In particular, the dual ring structure is more preferable than the single ring structure in terms of the traffic distribution effect and interference processing.

Figure 2:
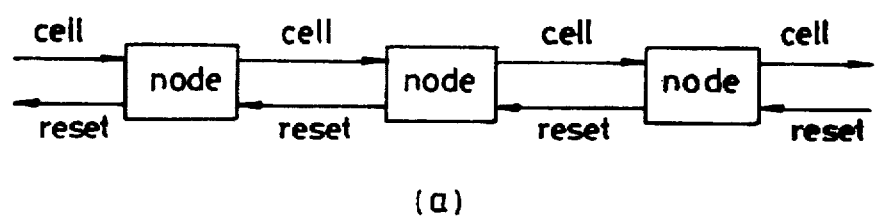
FIGS. 2 are diagrams respectively explaining showing the concept relating to the transfer direction of cells and reset signals in order to illustrate the principle of the present invention.
Figure 2:
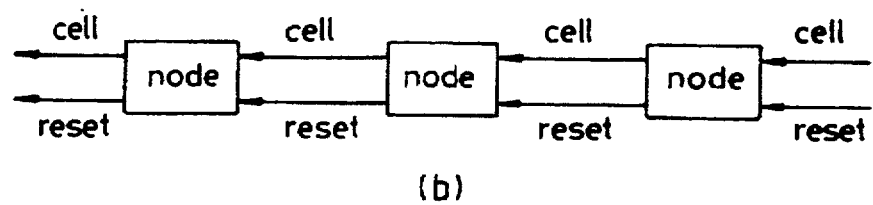

FIGS. 2A and 2B are diagrams respectively explaining the concept relating to the transfer direction of cells and reset signals in order to explain the principle of the present invention. FIG. 2A is for the case in which the transmitting direction of each reset signal is opposite to the transmitting direction of each cell. On the other hand, FIG. 2B is for the case in which the transmitting direction of each reset signal is the same as the transmitting direction of each cell.

For a cycle reset, each reset signal is transmitted in the same direction as each cell or opposite direction thereto in accordance with the distributed cycle reset protocol of the present invention, as shown in FIG. 2A or 2B. After analyzing the effect of the transmitting direction of each reset signal on the system performance through a computer simulation, it could be found that the effect is very minor in accordance with the present protocol.

Figure 3:
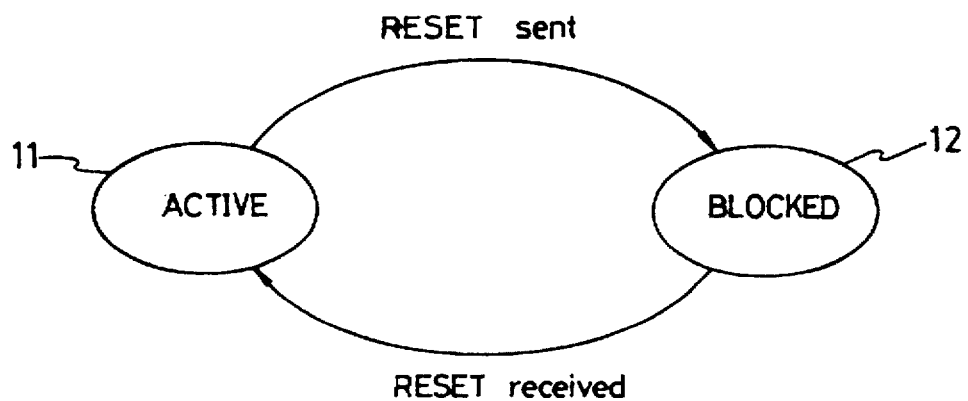
FIG. 3. is a schematic view showing the basic concept of a distributed cycle reset algorithm in accordance with the present invention.

FIG. 3 is a schematic view explaining the basic concept of a distributed cycle reset algorithm in accordance with the present invention. In FIG. 3, an active state 11 and a blocked state 12 are shown.

In the case of FIG. 3, each node is newly allocated with a predetermined amount of cells (namely, cell quotas) able to be transmitted within one cycle when it is reset. Every time the node receives an empty slot, it sends one cell while carrying it in the received slot. Every time the node sends one cell, it decrements the number of quotas by one. In such a manner, all cells existing in the transmitting queue of each node can be transmitted until the number of quotas becomes 0. Once a node has no cell quota, namely, the number of cell quotas thereof becomes 0, the node transmits a reset signal in the transmitting direction of reset signals fox cells, thereby informing a node adjacent thereto of the fact that all quotas are completely exhausted. The node, which has transmitted the reset signal, is then switched from the active state 11 to the blocked state 12 in which it is standby for an allocation of new quotas. From this blocked state, the node waits for a reset signal from another adjacent node. In the blocked state 12, cells which have arrived at each node for their transmission are standby at the transmitting queue of the node. When each node receives a reset signal, it is switched to its active state 11, so that it can start the transmission of cells in an amount corresponding to the number of re-allocated quotas.

Figure 4:
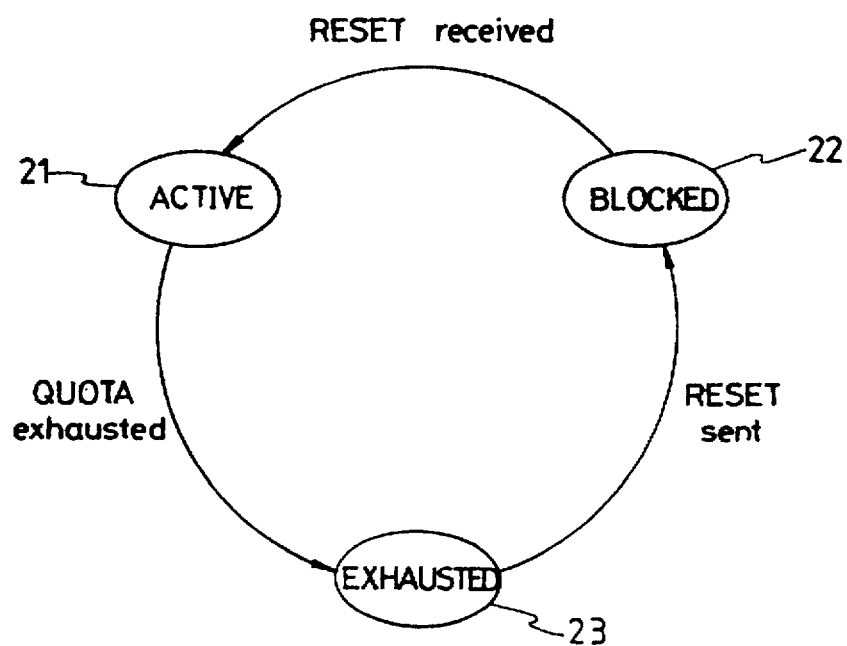
FIG. 4 is a schematic view showing the basic concept of a distributed cycle reset for traffics of a lower-order priority in accordance with the present invention when traffics are transmitted in the multiple-priority order.

FIG. 4 is a schematic view explaining the basic concept of a distributed cycle reset for traffics of a lower-order priority in accordance with the present invention when traffics are transmitted in the multiple-priority order.

In accordance with the present invention, the cycle reset for traffics of the lower-order priority can be generated only after the cycle reset for traffics with a priority higher than the traffics of the lower-order priority is generated. In this case, accordingly, the effect of the traffics with the lower-order priority on the service performance to the traffics with the higher-order priority is minimized.

If all cell quotas of the lower-order priority in one node are exhausted, then the node is switched to an exhausted state 23 and kept in the exhausted state until a cycle reset for the traffics of the higher-order priority is generated. When the cycle reset for the traffics of the higher-order priority is generated, a reset signal for the traffics of the lower-order priority is immediately transmitted from the node to a node adjacent thereto. The node, which has transmitted the reset signal, is then switched to its blocked state 22. In either the blocked state 22 or exhausted state 23, any cell of the lower-order priority can not be transmitted. After each node receives a reset signal from another adjacent node, it is switched to its active state 21 to re-allocate cell quotas for traffics of the lower-order priority.

This cycle reset scheme for the multiple-priority order is applicable to any order of at least two priorities. Since an access control can be achieved by defining only the reset signal to be transmitted to the adjacent node, the amount of the overhead required for the cycle reset can be very small.

Figure 5:
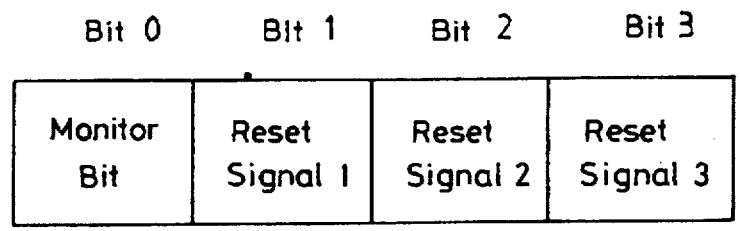
FIG. 5 is a diagram illustrating the format of a GFC area in accordance with the present invention.

FIG. 5 is a diagram illustrating the format of a GFC area in accordance with the present invention. This GFC area format can be applied to a GFC procedure for constructing a distributed subscriber's network of the broadband ISDN (B-ISDN).

The 0th bit of the format is used as a monitor bit for monitoring garbage cells essentially required for ring structures, whereas the remaining three bits are used as reset signals for three priorities, respectively.

Although the basic concept of the distributed cycle reset algorithm has been described in conjunction with FIGS. 1 to 5, the actual transition of the reset state in each node is more complex. In other words, each node involves a variety of states in accordance with the order of cell quotas being exhausted and the order of reset signals being arrived. As a result, the state transition has a more complex aspect.

Now, the cycle reset procedure for transmission of traffics in a multiple-priority order will be described in detail in conjunction with FIGS. 6 and 7.

Figure 6:
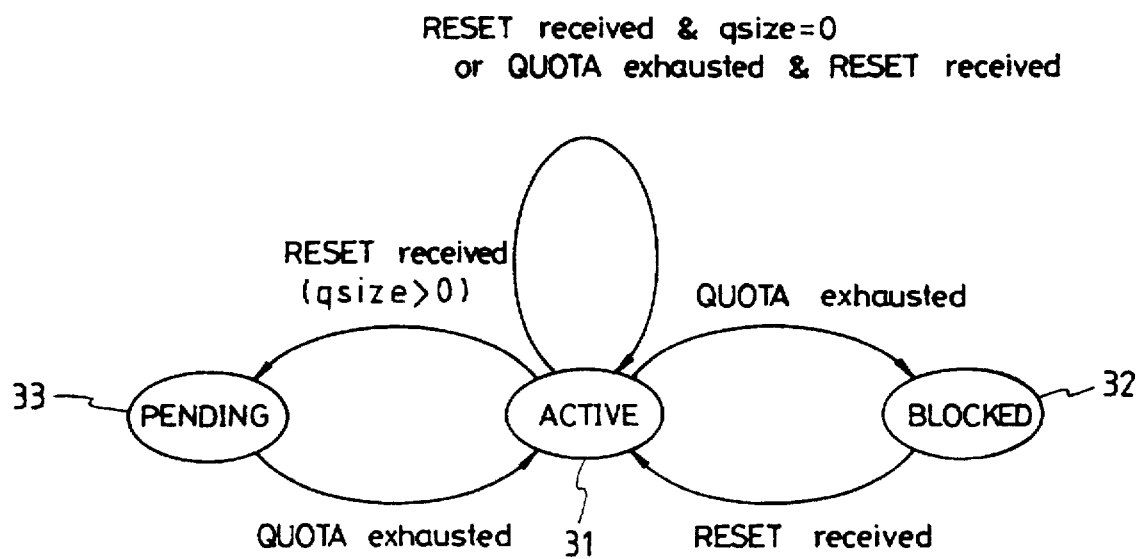
FIG. 6 is a schematic view illustrating a state transition of traffics with a higher-order priority.

FIG. 6 is a schematic view illustrating a state transition of traffics with a higher-order priority. FIG. 6 shows transitions between an active state 31 and either a pending state 33 or a blocked state 32.

The active state 31 corresponds to the state that the number of quotas for cells to be transmitted is not zero. In the active state 31, accordingly, each node normally transmit cells. When a node receives a reset signal from another node adjacent thereto in the active state 31 under the condition that its transmitting queue has standby cells, it is switched to its pending state 33 so that it can continuously perform the cell transmission. Meanwhile, when all cell quotas are exhausted in the active state of the node, this node is switched to its blocked state 22, thereby stopping the cell transmission.

Such transitions among the above three states are made in accordance with the exhaustion of cell quotas, the receipt of reset signals and the number of standby cells. Where a node receives a reset signal from another node adjacent thereto before all quotas thereof are exhausted, it is switched to its pending state. When the quota exhaustion occurs prior to the receipt of the reset signal, the node is switched to its blocked state. On the other hand, when the node receives the reset signal from the adjacent node under the condition that the number of standby cells is 0, it re-allocates its cell quotas irrespective of the number of remaining quotas, that is, performs a local reset and then transmits the reset signal to another adjacent node. Accordingly, the residing time of the reset signal in one node is minimized.

Figure 7:
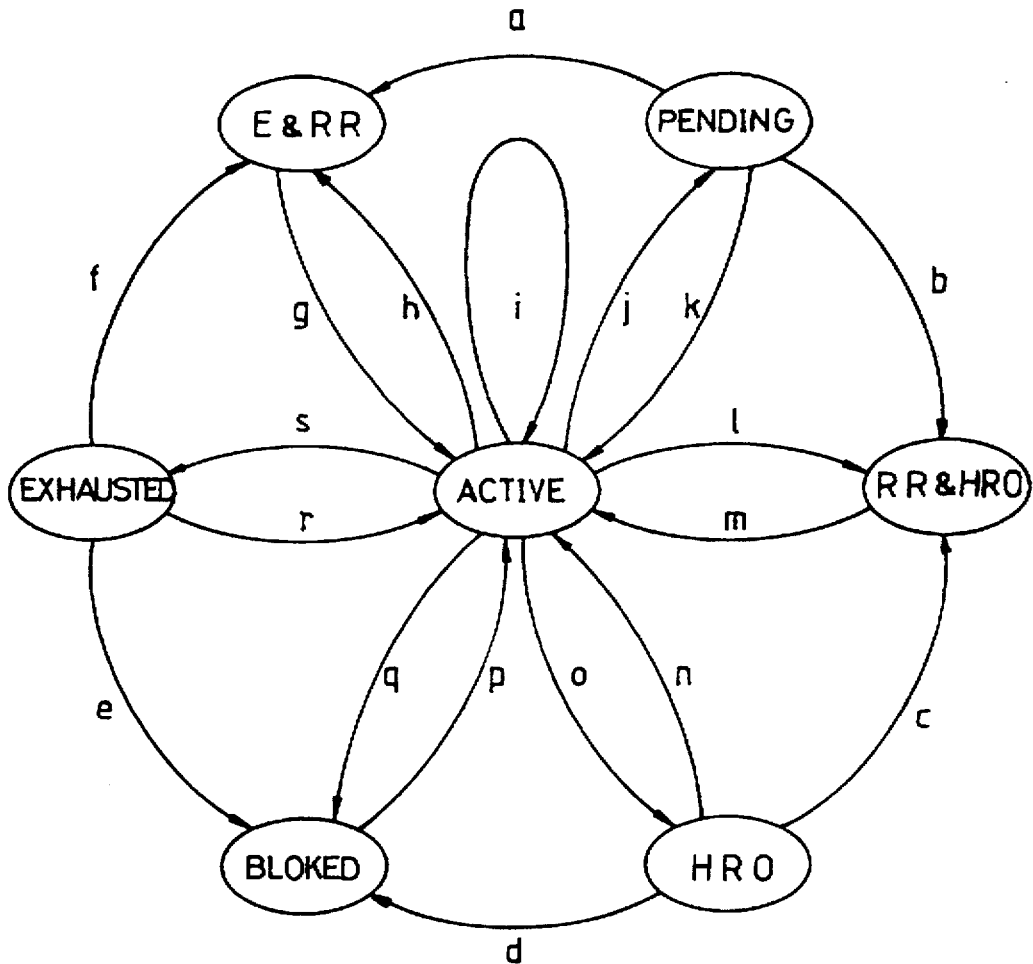
FIG. 7 is a schematic view illustrating a state transition of traffics with a lower-order priority.

FIG. 7 is a schematic view illustrating a state transition of traffics with a lower-order priority. In the case of FIG. 7, there are seven states, namely, an active state 41, a pending state 42, an RR & HRO slate 43, an HRO state 44, a blocked state 45, an exhausted state 46 and an E & RR state 47.

The active state 41 corresponds to the state that the number of quotas for cells to be transmitted is not zero. In the active state 41, accordingly, each node normally transmit cells. When a node receives a reset signal from another node adjacent thereto in the active state 41 under the condition that the number of cells is 0, it re-allocates its cell quotas irrespective of the number of remaining quotas, that is, performs a local reset and then transmits the reset signal to another adjacent node.

The exhausted state 46 corresponds to the state that although all cell quotas in a node have already been exhausted, the cycle reset for the higher-order priority has not yet been generated, and neither has the node yet received any reset signal for the lower-order priority. If all cell quotas in a node are exhausted, then the node is kept in its exhausted state 46 until the cycle reset for the higher-order priority is generated. Once the cycle reset for the higher-order priority is generated, the node is switched from the exhausted state 46 to the active state 41.

The blocked state 45 corresponds to the state that a node, in which its cell quotas has already been exhausted, waits for a reset signal for the lower-order priority under the condition that the cycle reset for the higher-order priority has been generated. If the node receives the reset signal for the lower-order priority, then it re-allocates its cell quotas for traffics of the lower-order priority. The node is then switched to its active state 41.

The pending state 42 corresponds to the state that a node, which still has its cell quotas, receives the reset signal for the lower-order priority before the cycle reset for the higher-order priority is generated. When a node receives a reset signal from another node adjacent thereto in the active state 41 under the condition that its transmitting queue has standby cells, it is switched to its pending state 42 so that it can continuously perform the cell transmission. Meanwhile, when the number of cells in a node is zero in the pending state 42, this node is switched to its active state 41 upon receiving a reset signal for the higher-order priority.

The HRO state 44 corresponds to the state that the cycle reset for the higher-order priority is generated in the active state 41. When the cycle reset for the higher-order priority is generated, the node is switched from the active state 41 to the HRO state 44. When the node receives a reset signal under the condition that the number of cells therein is zero (namely, the exhaustion of all quotas), it is switched again to the active state.

The E & RR state 47 corresponds to the state that a node, in which all quotas have been exhausted, waits for a cycle reset for the higher-order priority under the condition that it has received a reset signal for the lower-order priority. If the node receives a cycle reset signal for the higher-order priority, then it is switched to its active state 41.

On the other hand, the RR & HRO state 43 corresponds to the state that a node, which still has its cell quotas, receives a reset signal for the lower-order priority, under the condition that its transmitting queue has standby cells, after the cycle reset for the higher-order priority is generated.

The cell transmission is normally performed in the active, pending, HRO and RR & HRO states whereas it is not performed in the remaining states.

Conditions for such state transitions of traffics with the lower-order priority made among the above states include the exhaustion of cell quotas, the receipt of reset signals and the number of standby cells, as in the case of the higher-order priority. In the case of the lower-order priority, however, the condition for generating the cycle reset for the higher-order priority is also given as a state transition condition because the cycle reset for the lower-order priority can be generated only after the cycle reset for the higher-order priority is generated.

As apparent from the above description, the distributed cycle reset protocol according to the present invention reduces the reset overhead generated due to an increased medium distance and increased transmission rate in accordance with a reset made by the co-operation between two adjacent nodes.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. Apparatus, comprising a system and distributed cycle rest protocol mechanism used in the system, said system including a plurality of nodes sharing a single medium for transmitting and receiving cells during a cell transmission cycle, said cells having multiple priorities including a higher order priority and a lower order priority, said system allocating cell quotas to each of said nodes for cells of said higher order priority and of said lower order priority, said plurality of nodes including a quota-exhausted node, a lower order node and a higher order node, said quota-exhausted node having said cell quota for said cells of lower order priority of zero when a higher order priority reset signal has not yet been generated, said lower order node having not yet generated a lower order priority reset signal for transmitting to said quota-exhausted node, said higher order node having not yet received said higher order reset signal generated by said quota-exhausted node, said system still further including distributed medium connection control means for controlling said quota-exhausted node so that a non-zero allocation is reallocated to said cell quota for said cells of lower order priority for a new cell transmission cycle when said lower order priority reset signal is received by said quota-exhausted node after said higher order priority reset signal is generated by said quota-exhausted node.

2. The apparatus in accordance with claim 1, wherein amount of cells transmitted from each node is controlled by means for pre-allocating the amount of cells able to be transmitted in one cell transmission cycle.

3. The apparatus in accordance with claim 1, wherein when one of said nodes, which still has non-zero cell quotas, receives said higher order priority reset signal, then said one node is allocated with new quotas immediately after said one node transmits the lower order priority reset signal, thereby entering a new cell transmission cycle.

4. The apparatus in accordance with claim 3, wherein the one node transmits the higher order priority reset signal to the higher-order node when it has no standby cell to be transmitted at a point of time when it receives the lower order priority reset signal, so that it is allocated with the new quotas, thereby entering the new cell transmission cycle.

5. A distributed cycle reset protocol used in a system including a plurality of nodes sharing a single medium for transmitting and receiving cells during a cell transmission cycle, said cells having multiple priorities including a higher order priority and a lower order priority, said system allocating cell quotas to each of said nodes for cells of said higher order priority and of said lower order priority, said plurality of nodes including a quota-exhausted node, a lower order node and a higher order node, said quota-exhausted node having said cell quota for said cells of lower order priority of zero when a higher order priority reset signal has not yet been generated, said lower order node having not yet generated a lower order priority reset signal for transmitting to said quota-exhausted node, said higher order node having not yet received said higher order reset signal generated by said quota-exhausted node, said protocol comprising the steps of:

resetting a said cell transmission cycle for said higher order node after receiving the second higher order priority reset signal from the quota-exhausted node; and resetting a said cell transmission cycle for said quota-exhausted node after a said lower order node transmits a first the lower order priority signal to said quota-exhausted node and said higher order node receives the second higher order priority reset signal from said quota-exhausted node.

* * * * *